United States Patent [19]

Eickmann

[11] 4,230,198
[45] Oct. 28, 1980

[54] FLUID-STREAM DRIVEN GROUND VEHICLE

[76] Inventor: Karl Eickmann, 2420 Isshiki, Hayama-machi, Kanagawa-ken, Japan

[21] Appl. No.: 866,880

[22] Filed: Jan. 3, 1978

Related U.S. Application Data

[63] Continuation-in-part of Ser. No. 695,651, Jun. 14, 1976, abandoned, which is a continuation of Ser. No. 530,045, May 12, 1974, abandoned, which is a continuation-in-part of Ser. No. 121,971, Mar. 10, 1971, abandoned, which is a continuation-in-part of Ser. No. 782,349, Dec. 9, 1968, abandoned, which is a continuation of Ser. No. 551,023, May 18, 1966, abandoned, which is a continuation-in-part of Ser. No. 328,395, Dec. 5, 1963, Pat. No. 3,320,898.

[51] Int. Cl.$^2$ .............................................. B62D 57/04
[52] U.S. Cl. .................................... 180/7 P; 60/486; 114/150; 180/6.2; 440/37
[58] Field of Search .................. 180/1 P, 6.2, 6.24, 180/6.3, 6.48, 7 S, 7 P, 44 F; 244/17.23, 15, 60, 53 R; 60/486; 115/1 C; 114/150, 151

[56] References Cited

U.S. PATENT DOCUMENTS

| | | | |
|---|---|---|---|
| 280,247 | 6/1883 | See | 60/494 |
| 1,198,501 | 9/1916 | Wintermute | 180/7 P |
| 1,374,787 | 4/1921 | Walker | 180/7 P |
| 1,718,036 | 6/1929 | Douglass | 115/1 C |
| 1,999,296 | 4/1935 | Juergens | 180/7 P |
| 2,212,490 | 8/1940 | Adler | 244/60 |
| 2,454,138 | 11/1948 | Delzer | 244/60 X |
| 2,514,822 | 7/1950 | Wolfe | 244/2 |
| 2,712,876 | 7/1955 | Kuehn | 180/6.48 X |
| 2,804,016 | 8/1957 | Moore | 60/486 |
| 3,049,321 | 8/1962 | Nichols | 244/17.19 |
| 3,065,700 | 11/1962 | Blenkle | 180/6.48 X |
| 3,234,856 | 2/1966 | Martin | 114/150 X |
| 3,253,806 | 5/1966 | Eickmann | 244/17.23 |

FOREIGN PATENT DOCUMENTS 58961  5/1913  Fed. Rep. of Germany ........ 244/17.11

*Primary Examiner*—John P. Silverstrim

[57] ABSTRACT

The vehicle has a body provided with ground-engaging portions and has an imaginary longitudinal medial vertical face of symmetry. At least one pair of devices which produce fluid streams is disposed substantially symmetrically on opposite sides of the face of symmetry. The devices have axes of rotation which parallel one another and the said face of symmetry. The body has further mounted thereon at least one pair of matching hydraulic motors whose rotors are connected with the fluid-stream producing devices to drive the same. The motors are supplied at the same rate of flow with streams of hydraulic pressure fluid, and consequently the fluid-stream producing devices are driven at equal velocities and, in turn, produce equal reaction thrusts symmetrically on both sides of the said face of symmetry. This stabilizes the attitude of the vehicle and produces forward movement in the direction of its longitudinal axis.

The arrangement of the invention provides a controlled movement of the vehicle independent of the ground whereon the vehicle travels. Thereby it can travel on slippery ground. In addition the thrust-force of the vehicle is increased by means of utilizing a plurality of fluid stream producing devices. Such application of a plurality of fluid stream producing devices gives better efficiencies and considerable bigger thrust, than a single fluid-stream producing device would do at the same power installation. Thrust, control of movement and adaptability for travel on different grounds are increased.

2 Claims, 17 Drawing Figures

FLUID-STREAM DRIVEN GROUND VEHICLE

CROSS REFERENCE TO RELATED APPLICATIONS

This is a continuation in part application of my co-pending patent application Ser. No. 695,651, filed on June 14, 1976, now abandoned, which is a continuation application of my earlier application Ser. No. 530,045, filed on May 12, 1974, now abandoned, which was a continuation in part application of my earlier application Ser. No. 121,971, filed Mar. 10, 1971, now abandoned, which was a continuation in part of my application Ser. No. 782,349, filed Dec. 9, 1968, now abandoned, which, in turn was a continuation of earlier application Ser. No. 551,023 filed on May 18th, 1966 now abandoned, which was a continuation in part application of application Ser. No. 328,395, filed Dec. 5th, 1963 and now U.S. Pat. No. 3,320,898.

BACKGROUND OF THE INVENTION

Ground vehicles, such as cars, sleds and the like have already been proposed, built and used in the past. Cars also had already hydraulic motors for driving wheels. Boats have already been driven by air-propellers. Aircraft have already been proposed to be supplied with propellers to be driven by hydraulic motors.

However, these proposals of the prior art devices suffered from certain disadvantages which were never overcome. Some devices used a single working chamber group in their fluid flow supply device and split the resulting fluid stream into a plurality of flows; this resulted in a loss of control over the synchronization of the rotary velocity of the individual propellers. Others of the devices of the former art employed control communication between their several fluid lines, which could result in unequalness of rate of flow in the fluid lines. In either case, the control of such vehicles could become unstable and could prevent the effective and safe use of fluid stream-driven vehicles.

One of my above mentioned patent applications obtained a parallel patent application for a hydraulically operated aircraft, which is now my U.S. Pat. No. 3,823,898. From said patent it might assumed on a first glance, that ground borne vehicles might act as said aircraft of said patent. That however is not the case. The aircraft has a side radder for the control of its straight forward movement. The ground borne vehicle of my present invention does not need and does not have such radder. Its movement and movement direction is exclusively controlled by the equalness of thrusts symmetrically on opposite sides of the longitudinal vertical medial face of the vehicle. While an aircraft starts from a solid ground on an airbase, the vehicle of the invention will be controlled on slippery, unholding ground as well as on solid ground.

A conventional car for example can not travel by wheel drive on slippery ground, because the wheels would slip. A sled can not move an ascending way, when its driven snow mobile tracks slip on the snow.

An aircraft on the other hand is assumed to fly at high speed. At such high speeds its radder control works effectively. On ground however, during start or landing, the aircraft is mainly kept stright by the combination of plurality of control-actions, like radder control, strightly set wheels and throttle control of the engines. Since an aircraft has no definite exact direction control at low speed it requires a wide and long runway.

The ground borne vehicle of this invention is however not assumed to run exclusively on good solid highways or on good solid runways of airports, but on contrary also, or even mainly, on slippery unsolid ground. On such unsolid ground the vehicle of the invention must get a strong thrust force and a strong capability of directional control. That is different from the ordinary use of cars, sleds, aircraft and like.

In order to achieve a desired drive means for a vehicle of the invention different actions apply, which are different from those in cars, sleds or aircraft.

On the slippery ground, whereon the vehicle shall be able to travel, the drive means can not rely on any ground-traction means. The vehicle can also not rely on any holding of strightness of movement by ground-guide-or holding-means. The vehicle of the invention can also not rely on the common single air craft propeller for its drive. Because the common single propeller of an aircraft is effective only at high speed. The losses in common aircraft propeller drives would be too big in a vehicle of the invention and its thrust force for forward move would become to small.

To overcome those difficulties the vehicle of the invention applies a plurality of propellers arranged symmetrically opposite of the longitudinal medial plane of symmetry in order to abtain a higher thrust for the vehicle at a given power installation and the invention applies equalness of rate of flow in fluid lines in order to achieve equalness of rotary velocities and thereby of thrusts of the plurality of said propellers. A powerful stright forward drive of the vehicle is thus achieved by the invention and respective control means for driving courves may be added.

SUMMARY OF THE INVENTION

The present invention seeks to overcome the disadvantages of the prior art.

More especially, the present invention provides a novel fluid-stream driven ground vehicle which is not possessed of these disadvantages.

Another object of the invention is to provide such a vehicle which is simple and inexpensive.

A concomitant object of the invention is to provide such a vehicle which is highly stable in its attitude and can be readily and reliably controlled.

In keeping with these objects, and with others which will become apparent hereafter, one feature of the invention resides in a fluid-steam driven ground vehicle which, briefly stated, comprises a body having ground-engaging means and a longitudinal vertical medial face of symmetry. At least one pair of rotary fluid stream creating means is symmetrically disposed on opposite sides of the longitudinal face of symmetry and these means have axes of rotation parallel to one another and to the face of symmetry. At least one pair of matching hydraulic motors is provided, including stators mounted on the vehicle body, and rotors which are connected with the fluid stream creating means, respectively, for driving the same; hydraulic flow producing means has two outlet conduits and two return conduits connected with the hydraulic motors, respectively, for supplying to these matching hydraulic motors pressure fluid at the same rate of flow, whereby the fluid stream creating means are driven at equal velocities for producing equal reaction thrusts symmetrically on both sides of the longitudinal face of the body, to thereby stabilize the attitude of the vehicle and produce forward movement thereof in the direction of the longitudinal vertical medial face of symmetry.

The above however would not have been obtained, if there would not have been a deep investigation of the matters of influence to a vehicle of the invention.

On the boats of the everglades you find a big propeller mounted highly above the boat. This propeller does not only provide a forward thrust to the boat, but it also provides as a side effect a downwrad tilt of the front of the boat. Because the centre of thrust is not in the medial axis of the boat, but high above it. On the aircraft you find a propeller which is very effective and obtains total efficiencies of 60 and more percent at high speed. At zero or little speed of the aircraft however, the efficiency of the aircraft propeller is aolmst zero. At low speed it is not effective and can not supply high thrust. A propeller with a considerable thrust is the rotor of the common helicopter. The characteristic adjective of a helicopter rotor however is its bid diameter. Without such big diameter a required big thrust can not be obtained.

The invention investigated this matter and found, that a big diameter rotor of a helicopter would apply a big desired thrust to the vehicle, but the ground borne vehicle of this invention has no place to set such big diameter helicopter rotor. The centre of thrust of a big diameter rotor of a helicopter, even if applied with horizontal axis, would be so very high above the vehicle, that the thrust of the propeler would force the nose of the vehicle down and into the slippery ground. The vehicle would then tilt forward-over and crash. Thus, the invention found, that the commonly known technology can not be applied to this vehicle. The helicopter rotor would crash the vehicle and the aircraft propeller would use up tremendous amounts of fuel, but it would not supply any desired good thrust force to the vehicle, for moving it at slow speed an difficult terrain.

The invention now came out substantially by the following consideration:

The thrust of a propeller on a vehicle with the forward velocity=zero is according to an equation of the inventor:

$$T = \sqrt[3]{2 \text{ rho } A N^2} \quad (1)$$

wherein the propeller circle are Fl can be replaced by: $d^2 \text{pi}/4$.

T is the thrust in Kg.

rho is the density of air. On earth surface about 0,125 in m-kg-s system.

A is the area of the propeller circle in $m^2$ and d is the diameter of the propeller in meter.

Under the mathematic rules for roots equation (1) can be transformed to:

$$T = \sqrt[3]{29} \cdot \sqrt[3]{N^2} \cdot \sqrt[3]{d^2} \cdot \sqrt[3]{\frac{\pi}{4}} = Kg. \quad (2)$$

Pi is 3,14.

Assuming now, that we intend to drive the vehicle with a predetermined power, we recognize, that we can not change the first two rootes in the equation (2). We also desire to build the vehicle with a little diameter of the propeller, because we recognized already, that the big helicopter rotor would tilt and crash the vehicle. Therefore we will maintain all liberties regarding the third root in order that we can give that diameter of propeller to the vehicle, which is suitable for the vehicle without crashing it.

Our attention will therefore be focused onto the only remaining fourth root of equation (2) and that will lead to the invention.

The equation (1) was valid for one single propeller.

We now intend to use 2 propellers. That will require to set a "2" before pi under the root. If we intend to use 4 propellers we will have to set a "4" before "pi" under the root and so on. When we thereafter calculate the fourth rootes out, we obtain the knowledge of this invention:

"At zero move or at low speed move, close to zero, a vehicle of equal power and of equal diameter of propeller(s) tracts 1,26 times more with two propellers;
1,58 times more with four propellers;
1,82 times more with six propellers, and
2,00 times more with eight propellers, than it would tract with a single propeller of equal diameter, when the same power would be supplied."

With this knowledge we will now be able to build a ground borne fluid-stream driven vehicle with little diameter of propellers without loosing thrust. We are now able to prevent the forward-over crash of the vehicle under a big helicopter rotor of high centre of thrust.

We can now also recognize, that we can build the diameter of the propellers so small, that the propellers can be contained in protecters or in ducts. Our ground borne vehicle shall be able to run not only on slippery ground, but also for example in towns. An aircraft can not be allowed to run on the street in the town, because the free propellers of the aircraft would cut the heads of the people walking on the street off. But, now since we, according to the above knowledge have the means to use small diameter propellers without loosing thrust, and since these small propellers can be protected in ducts, and since our small diameter propellers are sepcifically effective at walking speed of persons in town and at car speed in town-traffic, we can use strong truction and stopping forces of the protected propellers, so, that no raffic and no persons in town traffic can be hurt.

At same time we can apply without crashing the vehicle strong traction or thrust in order to drive the sled of the invention upwards on an ascending way or the car or like over resistant uneven, unsolid, bad terrain.

In order to make the vehicle of the invention safe, we have to do another invention, too.

This is, to discover, what terrible accidents can happen, when we would apply a wrong hydraulic drive system. The aircraft with split flows out of one single flow can bring terrible accidents. This will be appearant from the book "90 minutes at Entebbe" page 86, Bantom books N.Y., 1976. The following is a copy thereof:

"In the kind of short takeoff needed at Entebbe, the acceleration would be breathtaking. The captain in such an operation keeps his left hand on the nose steering wheel and his right hand on the throttles. He keeps the two outboard engines at half power and the inners at full power while his copilot juggles frantically to keep the wings level by using the ailerons. The reason is that the tremendous power generated by the four turboprops becomes dangerous if one engine fails during the critical run-up to 90 miles an hour. Below that speed there is not enough rudder control to counteract the terrific drag on the side with the failed engine. "Flying the ailerons" is an unusual technique, required because the fat low-pressure tires and narrow landing gear are not enough to prevent, at worst, one wing digging down too far until the Hercules "roller-skates" sidewards."

The said copy of a portion of said book clearly reports, that, when an engine fails on one side of an aircraft, the aircraft can be forced into a stiff left or right turn and thereby crash.

Considering now, that the hydraulic aircraft drive of the former art, namely the split flow out of one flow would be applied, and one of the fluid motors would stick, all the fluid would flow into the other fluid motor on the other side of the medial plane of symmetry of the vehicle. Said fluid motor on said other side would than revolve much faster than before, because it would now receive all the power of the drive means. The thrust of the propeller driven by said motor would then become very high and the vehicle would be forced into a very, very stiff left or right turn. It might crash. Thus, wile in the conventional non-hydraulic prpeller driven aircraft only one propeller on one side would fail, the hydraulically driven propeller craft of the former art would not only get a propeller failure on one side, but in addition thereto an almost doubled thrust on the other side of the face of symmetry of the vehicle. Thus, the turn and/or crash of the hydraulically propeller driven vehicle of the former art will be much stiffer and more dangerous, than the respective turn or crash of the conventional propeller-driven vehicle without hydraulic drive of the propeller.

Therefore, according to this invention, only those kind of fluid flow producing means are allowed in the vehicle of the invention, which supply separated flow of fluid under equal rate of flow in the separated flows. Separated fluid lines must be set forth each separated outlet of the fluid flow supply means to the respective hydrulic propeller driving motor. It is further recommended, that the hydraulic motors be of equal intake fluid volume per revolution and that motors on opposite sides of the medial plane of symmetry are driven in opposite rotary direction.

Thus, the vehicle can be kept in straight forward motion by the drive means of the invention, and it can be stopped with high braking force in case of need in traffic. Never will at such operation the vehicle of the invention brake out to right or left.

The combination of both described discoveries of the invention has led by this invention to a most safe and reliable as well as economic operable ground-borne vehicle.

Sidewards control means may be set under the main control means for limited side-turn control ability, if they are set so, as later described in this specification and if they can not be applied accidentically for disturbance of the stable stright forward move or brake of the speed of the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 5:
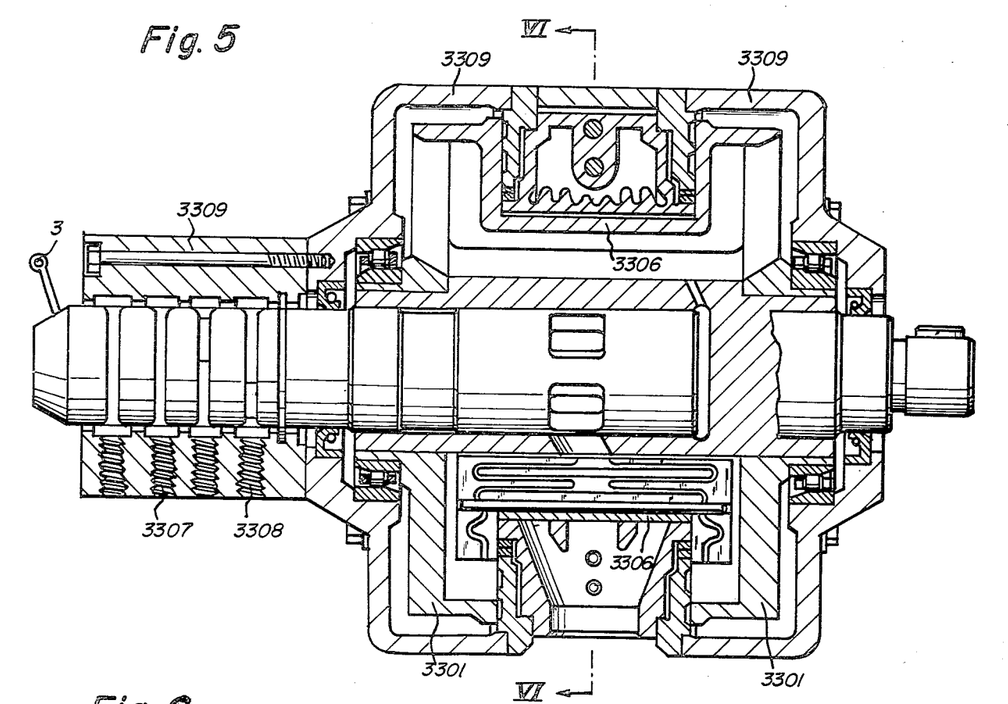
FIG. 5 is a longitudinal sectional view showing an embodiment of the double flow pump for producing two separate flows of fluid at equal rates of flow, as disclosed in FIG. 61 of my U.S. Pat. No. 3,320,898.
Figure 6:
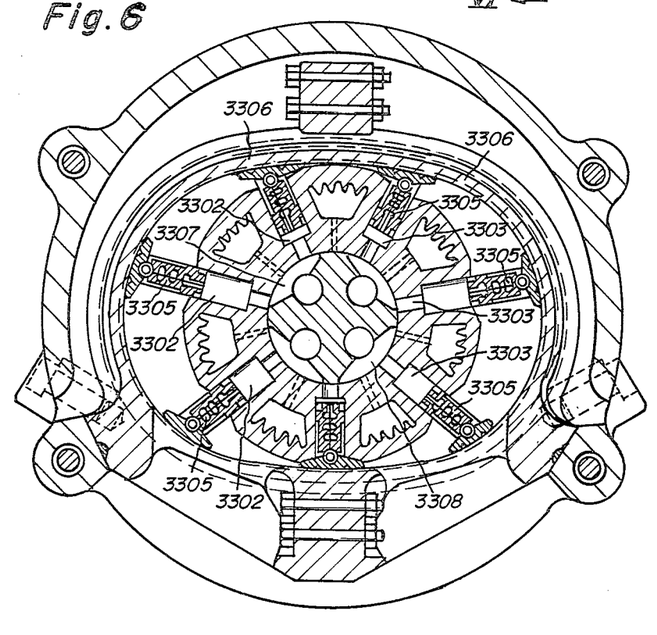
FIG. 6 is a cross section taken on line VI—VI of FIG. 5.
Figure 7:
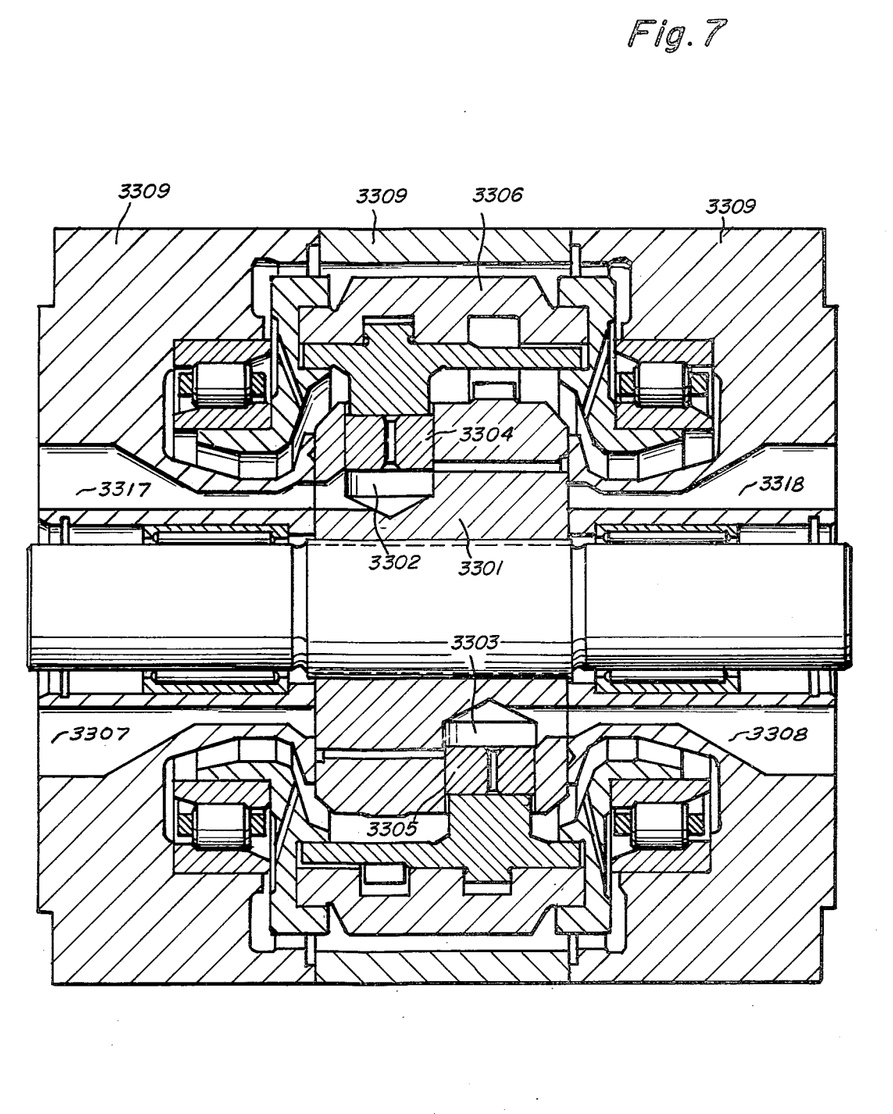
FIG. 7 is a longitudinal sectional view, illustrating another embodiment of a pump having two separate flows of equal rates, and corresponds to FIG. 2 of my U.S. Pat. No. 3,683,751.

In all embodiments of the invention a double flow fluid supply device, such as a double flow pump of the type shown in FIGS. 5, 6 and 7, or else a four-flow pump, is used. FIGS. 5 and 6 and FIG. 7 illustrate different embodiments serving the same purpose and will be together described with particular reference to FIG. 7.

In the fluid flow supply device, or pump, of FIG. 7 and FIGS. 5, 6, a rotor 3301 is rotatably mounted in a housing 3309. Inlet passages 3307 and 3308 extend through a corresponding housing end portion to corresponding stationary control faces on the respective housing portions, where they form inlet control ports, and corresponding outlet passages 3307 and 3308 are provided. The rotor 3301 contains two separate groups of fluid handling working chambers 3302 and 3303 which are separated from each other by the walls of the rotor, and have no communication whatsoever. The complete fluid-tight separation of two groups of working chambers 3302 and 3303 from each other has the important result that at the two outlets, separate flows of fluid having an equal and proportionate rate of flow are produced. Displacement means, for example piston 3304 and 3305, are associated with each fluid handling working chamber 3302 or 3303. Each working chamber group contains a number of working chambers which may be cylinders in the embodiment of FIG. 7 and vane slots in the embodiment of FIGS. 5 and 6. The number of working chambers may be five or nine. About half of the working chambers of each working chamber group communicates with the inlet port, and an equal number communicate with the outlet port at the respective moment. During the revolution of rotor 3301, each working chamber communicates for a time with the inlet port and during another time with the outlet port. The outlet control ports are also fluid-tightly separate from the inlet control ports. Consequently, expanding fluid receiving chambers of each working chamber group 3302 and 3303 form separate inlet spaces together with their respective inlet port, while the respective contracting and fluid expelling chambers of the separated working chamber groups 3302 and 3303 form separate outlet spaces together with their respective outlet port.

The displacement means, for example, the pistons or vanes 3304 and 3305, are connected to side shoes which slide along the inner circular surface of an actuator ring means 3306 common to both groups of pistons. The common actuator means is eccentric to the axis of the rotor 3301, and can be adjusted to vary the eccentricity of its center in relation to the axis of the rotor for varying the delivery stroke of the pistons for the discharge of fluid out of the working chambers 3302 and 3303, simultaneously in both groups of chambers. That means that if the common actuator means 3306 causes a piston 3304 of the working chamber group 3302 to perform a stroke of a certain length, the same stroke will be carried out by the respective piston 3305 of the working chamber group 3303.

Thus, if fluid is expelled from the working chamber group 3302 at a given time at a certain rate of flow, then the fluid will be expelled from the other working chamber group 3303 at the same rate of flow. The cylinders and pistons, or vane slots and vanes, in both working chamber groups have the same dimensions, and are fitted with the same clearances, and are also of the same material as both separate working chamber groups 302 and 3303. Working chambers 3302 supply the flow of fluid into separate fluid ports 3307, and the working chambers 3303 supply the flow of fluid into the other separate fluid port 3308.

Figure 1:
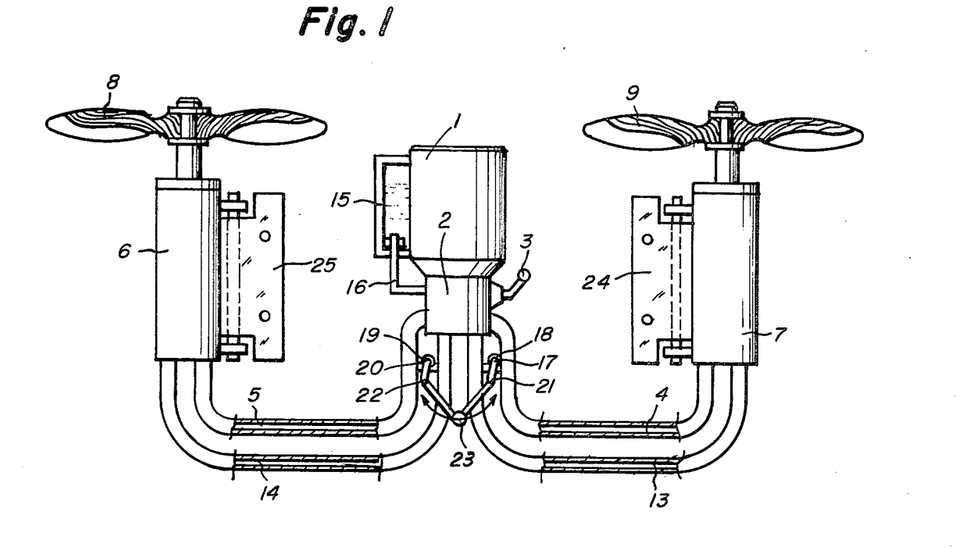
FIG. 1 illustrates a hydrostatic power supply unit according to one embodiment of the invention, which can be attached to any ground-engaging vehicle of the invention.
Figure 2:
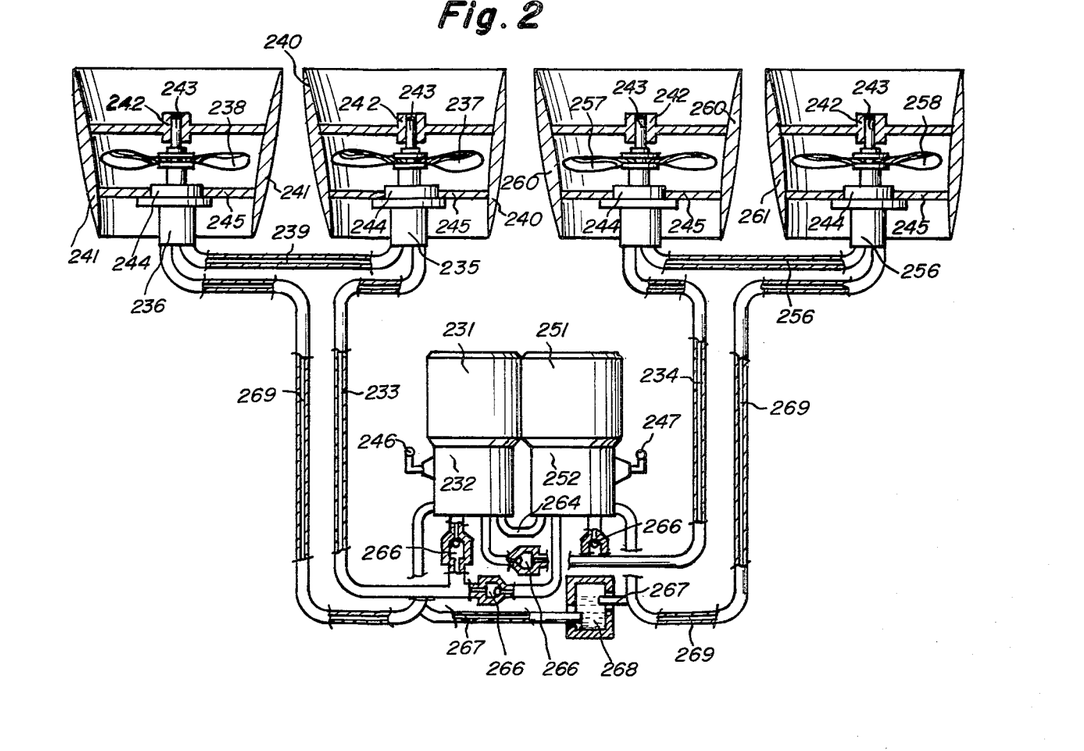
FIG. 2 is a partially sectioned view, showing another hydrostatic power supply unit according to the invention which utilizes a multi-stream drive.
Figures 3, 10:
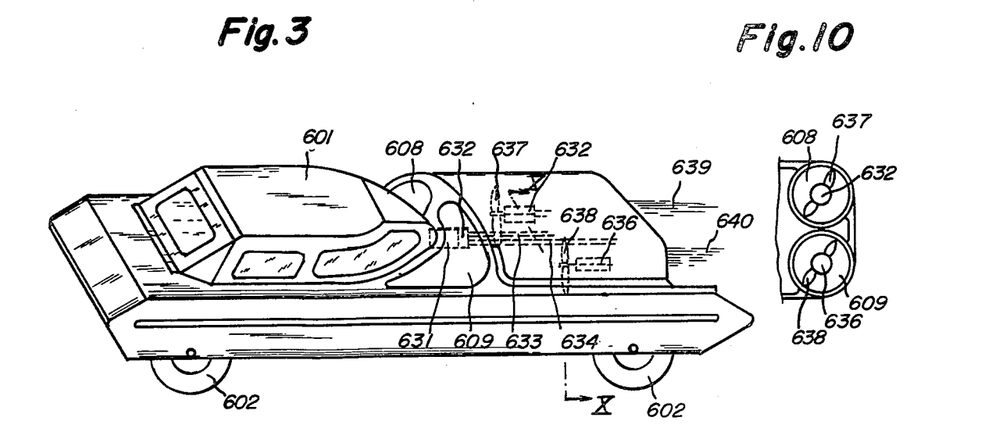
FIG. 3 is a perspective view, showing a ground vehicle according to one embodiment of the invention.
FIG. 10 is a section taken on line X—X of FIG. 3.

FIG. 1 illustrates an embodiment of a propulsion plant for a fluid stream driven vehicle which is inexpensively built, handles easily, and is very safe in operation. A vehicle body as shown in FIGS. 2 or 3 carries a power plant or prime mover 1, and a multiple flow variable pump of the type described with reference to FIG. 7. The rotor of pump 2 is driven by the prime mover 1, and produces at least two separate flows out of the outlets 3307 and 3308 shown in FIGS. 5 to 7. Adjusting means 3 is provided for adjusting the eccentric position of the actuator ring means 3306 so that the two flows of fluid out of said two outlets 3307 and 3308 are increased or reduced, while remaining equal at all times. The flows of fluid may be varied simultaneously between a zero flow rate, and the maximum flow rate.

The hydrostatic power supply unit of FIG. 1, which is better described as a hydraulically controlled fluid stream unit, may be transportable and may be fixed to any kind of vehicle by the adapting means 24 and 25. It is preferred to set the power plant 1 into or onto the body of the vehicle and to set the rotary members 8 and 9 by means of fixing the bearing means 24 and 25 onto the vehicle. By mounting the hydraulically controlled fluid stream drive means of FIG. 7 onto a vehicle, it is possible to drive the respective vehicle horizontally straight forwards or to move it leftwards or rightwards or to incline it or even to turn it completely around on a point by means of the separate flows of fluid through fluid passages 4 and 5, or by exercising the bypass means 18 or 20, or both together by the combined control means 25. It would be suitable to fix the hydrostatically controlled fluid stream drive means of FIG. 1 to land vehicles such as cars, trucks, sleds and the like, as long as they are of the type which move through a fluid so that the rotary members 8 and 9 can produce a stream of fluid or streams of fluid for driving the vehicle. It would be possible to connect the fluid motors 6 or 7 to the fastening or bearing means 25 or 24 in such a way that the fluid motor can be swung into the vehicle or out of the vehicle by pivoting means connected between the bearing means 25 or 24 or fluid motors 6 or 7.

The power plant and fluid flow producing means 1 is connected to the delivery fluid lines 4 and 5. Delivery fluid lines 4 and 5 are connected to the rotary parts in the fluid motors, epseically positive displacement fluid motors 6 and 7. Rotary members, such as propellers 8 or 9, are connected to the rotary parts of fluid motors 6 or 7. Return fluid lines 13 and 14 return from the fluid motors 6 or 7 directly or indirectly to the fluid flow producing means 1. Fluid flow producing means 1 may take fluid out of tank 15 through two lines 16.

A fluid stream propelled rolling or sliding ground-engaging vehicle according to the invention comprises at least one pair of matching fluid operated motors 6, 7 mounted on a body 10 having an axis of substantial symmetry; a pair of stream creating means 8, 9, namely propellers 8 and 9 driven by the motors 6, 7, respectively, and arranged symmetrically on opposite sides of said axis; at least one hydraulic fluid flow producing means 1, for example the double flow pump shown in FIG. 7, having at least a pair of separate fluid handling chambers 3302, 3303, and including means for fluid-tight separation of the chambers and outlets, 3307 and 3308; a pair of displacement means, for example the pistons 3304, 3305, associated with fluid handling chambers 3302, 3303, respectively; common actuator means in the form of a ring 3306 eccentric to the axis of rotor 3301, cooperating with the two displacement means or pistons 3304, 3305 for maintaining equal movement of the displacement means 3304, 3305 so that fluid flows in the outlets 3307, 3308 at proportionate and equal flow rates; and a pair of delivery passage means 4, 5, see FIG. 1, connecting the outlets 3307, 3308 with the motors 6 and 7, respectively. In this manner the air stream creating means or propellers 8, 9 are driven at equal velocities for producing equal thrusts on both sides of the axis for stabilizing the movement of the vehicles at high speed.

The adjusting means 3 shown in FIG. 1 are connected with the common actuator means 3306 for varying the eccentricity of the inner circular surface thereof in relation to the axis, so that both displacement means 3304, 3305 are simultaneously and equally adjusted to vary the equal flow rate in the outlet 3307 and 3308 which communicate with the delivery passages 4, 5 connecting the outlets with the hydraulic motors 6 and 7.

Fluid flow adjustment means 3 is able to control the displacement volume of the displacement chambers in fluid flow producing means 1 proportionately to each other if they change their volume. The control adjustment means 3 therefore assures that at all times at least a plurality of flows, like a pair of flows, of equal rate of flow or of proportional rate of flow is led out of fluid flow producing means 1 separately, and into the separated fluid lines 4 and 5, whereby the proportionality of the rotary angular velocity of rotary members 8 and 9 is assured at all time. Bypass means 18 and 19 may be set between the delivery fluid lines 4 and 5 and the respective return fluid line 13 or 14. Inter-fluid lines 17 or 20 may enable the flow of a small fraction of fluid which flows through the delivery fluid lines 4 or 5 into the return fluid lines 13 or 14. The bypass means 18 or 19 may be operated either separately from each other or they may be operated in unison by combined operating means 23, e.g., a handle 1, which is connected by connection means 21 and 22 to the bypass means 18 and 19. By using the combined operating means 23 for controlling both bypass means it is possible by a single handle to change the rotary velocity of the rotary members 8 and 9 relative to each other and is thereby possible by only one handle to change the thrust of the fluid streams produced by rotary members 8 and 9 relative to each other to any desired extent. The pair of fluid streams which is actuated by rotary members 8 and 9 provides a resulting thrust of a pair of thrust forces which can be utilized to propel or to drive a vehicle. The change of the thrusts of these fluid streams relative to each other by the one combined control means 23 makes it possible to change the direction or location of the vehicle.

There are several special features shown in FIG. 2. One of these is that a delivery fluid line 233 transfers a flow of fluid into a positive displacement fluid motor 235 while the return flow out of fluid motor 235 flows through a medial passage 239 into a downstream fluid motor 236, wherefrom the return fluid stream flows through return fluid line 269 directly or indirectly back to a respective fluid flow producing means or a tank. A second fluid stream is guided through delivery fluid line 234 into an upstream positive displacement fluid motor 255 and out therefrom through medial fluid line 259 into downstream fluid motor 256 from where it returns through fluid line 269 directly or indirectly back to a fluid flow producing means or a tank. It is therefore assured that two flows of fluid which are separated from each other and which are each flowing through the fluid lines 233 and 234, respectively, together drive four fluid motors, i.e., each flow drives two fluid motors. Thereby it is possible to use only two flows of fluid to create four streams of fluid of proportionate rate of flow.

For this purpose, the rotary parts of the respective fluid motors are connected to the rotary members 238 or 237 or 257 or 258. Since the fluid flow producing means according to this invention necessairly provide for proportionality of the rate of flow in the separated flows of fluid, proportionality of the rotary velocity of the fluid motors and thereby also of the rotary members or propellers 237, 238 and 257, 258, is assured. Consequently, it is assured that four fluid streams are created by the hydraulically controlled fluid stream drive means of FIG. 2 and that the reaction forces and thereby the thrusts of the fluid streams are maintained proportionate under all operational conditions.

As a further characteristic of the embodiment of FIG. 2, the rotary members are provided in ducts. Thereby the thrusts of the fluid streams relative to the hydrostatically controlled fluid stream drive can be considerably increased. For this purpose, fluid motor 235 is borne by flange means 244 in a fastening means 245 of tubular ducting means 240. The shaft of the rotary member of fluid motor 235, and thereby the rotary member 237 which is attached to the shaft 243 of fluid motor 235 can be borne in bearing means 242. In the same way, fluid motor 236 is fastened by flange means 244 and fastening means 245 of duct means 241 and the shaft 243 of fluid motor 236 may be guided in bearing means 242 which is fastened on duct means 241. Fluid motor 255 may be borne by flange means 244 on fastening means 245 of duct means 260 and the shaft means 243 of fluid motor 255 may be borne in bearing means 242 of duct means 260. Fluid motor 256 may be borne by flange means 244 on fastening means 245 of duct means 261 and the shaft of fluid motor 256 may be borne in bearing means 242 of duct means 261. The feature of this part of the embodiment of FIG. 2 is that the propellers or rotary members are safely contained in tubular ducts so that persons or animals cannot accidentally come in contact with the revolving members. Furthermore, the vehicle is generally safer when the propellers or rotary members are provided in ducts. Furthermore, by the provision of ducts, the thrusts of the fluid streams which flow therethrough is considerably increased.

Another characteristic of the embodiment shown in FIG. 2 is that a plurality of fluid flow producing means 232 and 252, which are actuated or driven by power plants 231 or 251, is provided and that they are connected to each other. For example, they may have a common return or interconnecting return fluid line 264. They may also have common or separated suction lines or two delivery fluid lines which may transfer fluid out of a tank 268 into the respective fluid flow producing means 232 and 252. Each of the fluid flow producing means 232 and 252 produces at least a pair of separated flows of fluid of proportionate rate of flow. One flow of fluid moves out of fluid flow producing means 232 through check valve means 266 into fluid line 233, and another flow of fluid of proportionate flow rate travels separately out of fluid flow producing means 252 through check valve 266 into the common fluid line 233. By combining the flows of fluid out of the separated fluid flow producing means 233 and 252 via check valves 266 in the fluid line 233, the latter has become a common fluid line.

Another flow of fluid of proportionate rate of flow travels from the means 232 through another check valve 266 into the fluid line 234. A further flow of fluid which is also separated and of proportionate rate of flow travels out of the other fluid flow producing means 252 through another check valve 266 into the fluid line 234. By combining each fluid flow from fluid flow producing means 252 and 232 into one fluid line, the fluid line 234 has become a common delivery fluid line. If, now, during operation one of the power plants 231 or 251 should fail, or if one of the fluid flow producing means 232 or 252 should fail to deliver the separated flows of fluid, then the other fluid flow producing means would still continue to deliver at least one flow of fluid into at least one common fluid line 233 and at least one other flow of fluid into another common fluid line 234. The respective check valves 266 would prevent a flow of fluid back out of the common fluid lines 233 or 234 and into the respective not delivering fluid flow producing means 232 or 252. Thereby, a safe operation of the hydraulically controlled fluid stream drive means is assured and maintained, even if one of the power plants or fluid flow producing means should fail. The return fluid lines 269 may return the flows of fluid from the downstream motors directly or indirectly into the tank 268, or via cooling means into the tank 268, or directly into the respective fluid flow producing means 232 and 252, or into the medial fluid line 264 therebetween. Passage 264 may also be a drain line. The fluid lines 267 may be suction fluid lines or fluid lines which are delivering fluid into the fluid flow producing means 232 or 252. Instead of providing only two fluid flow producing means 232 and 252, it may also be possible to provide many fluid flow producing means and the necessary respective power plants to adapt them to the respective fluid flow producing means.

Fluid flow producing means 232 or 252 are preferably provided with fluid flow adjustment means 246 and 247. Thereby the displacement volumes of the positive displacement chambers in the fluid flow producing means 232 or 252, which are changing from minimum to maximum, and vice versa, during the operation of the fluid flow producing means is proportionately adjusted so that the subtraction of the minimum volume from the maximum volume of the respective positive displacement chamber remains at all times proportionate to the respective volume of others of the positive displacement chambers.

It is possible to operate the adjustment control means 246 or 247 separately or together. The hydraulically controlled fluid stream drive of FIG. 2 may be set onto or built into all suitable ground vehicles which move in or through fluid. Other means may be added to this hydraulically controlled fluid stream drive or some of its parts displaced therein may be subtracted.

In FIG. 3 another embodiment of a hydraulically controlled fluid driven vehicle of this invention is shown which constitutes a land vehicle that may roll on wheels or rollers 602. The body 601 of this vehicle is borne on wheel means 602. A power plant 631 is provided in the vehicle and may drive a fluid flow producing means 632. Fluid flow producing means 632 delivers two flows of equal rate of flow. The flow of fluid is passed from fluid flow producing means 632 through fluid flow delivery lines 633 into and through the rotary parts of fluid motor 635 and back therefrom through a return line directly or indirectly again into the fluid flow producing means 632. Another flow of fluid is passed from fluid flow producing means 632 through delivery fluid line 634 into and through the rotary parts of fluid motor 636 and back therefrom through a return fluid line directly or indirectly into the fluid flow producing means 632 again. A propeller 637 is connected to the rotary parts of fluid motor 635 and another propeller 638 is connected to the rotary parts of fluid motor 636. If the fluid flow producing means 632 operates and delivers the said flows of fluid, then the revolving members 637 and 638 are producing streams of fluid 639, 640 especially of air. These streams of fluid are separated from each other and are of equal rates of flow or of proportionate rates of flow. It is, however, preferred to make them at equal rates of flow. Furthermore, it is preferred to set the rotary members and the fluid motors at spaced locations onto or into the vehicle but space them equally from an axis of the vehicle. If the fluid streams 639 and 640 are equally distanced from the longitudinal axis of the vehicle and are of equal rates of flow, maintained by the heretofore described fluid flow drive means, then the vehicle is driven forwards by the reaction forces of the fluid streams 639 and 640. It is preferred to set the rotary members 637 and 638 into respective ducts, for example the ducts 608 and 609, of the vehicle. Thereby it is prevented that animals or persons might accidentally get into the revolving propellers.

The proportionality of fluid flows and of fluid streams which has been described heretofore, provides the safety and stability of the drive or motion of the vehicle which is desired. It is possible in accordance with this embodiment of the invention to maintain the equality or proportionality of the rate of flow in the fluid streams 639 and 640 and thereby to maintain proportionate or equal reaction forces which are driving the vehicle. The driving forces of the fluid streams and the resisting forces on the vehicle or its wheels can be placed in equilibrium and thereby the straight forward motion of the vehicle is assured. It would, however, be possible to use bypass means or additional flow control means in order to vary the rotary velocity of the rotary parts of the fluid motors and of the revolving members thereof so that the rate of flow in the fluid streams 639 and 640 can be changed relatively to each other so that the vehicle would be forced to travel in a curve or to incline. A specific feature of the embodiment of FIG. 3 is that the vehicle can be driven and that the driving direction can be kept stable, regardless of the conditions of the ground and the weather. It is not necessary that the vehicle wheels 602 are driven. Sometimes the ground is slippery and driving wheels 602 could slip. Accidents which were due to the slipping of wheels of land vehicles on ground can be prevented by the specifics of FIG. 3 wherein the proportionality or equality of the fluid streams serve to maintain the stability of the forces acting on the vehicle during its move.

The vehicle of FIG. 3 is, therefore, very safe; under certain conditions it is safer than any wheel driven vehicle. Furthermore, there is a limit to the ability to drive vehicles on land at high speed by means of driven wheels. On the contrary, a vehicle can under certain circumstances be driven faster by the fluid streams 639 and 640 of FIG. 3 than would be possible by the use of wheels.

Figure 4:
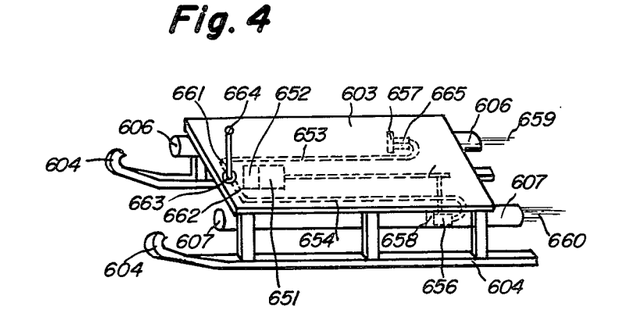
FIG. 4 is a view analogous to FIG. 3 but illustrating another embodiment of the invention.

In FIG. 4 a fluid stream driven vehicle is shown which may be a sled. In this example, the body 603 of the sled is mounted on runners 604. Also connected to the vehicle of FIG. 4 are the ducts 605 and 607. Duct 606 contains one or more fluid motors 665 and duct 607 contains one or more fluid motors 656. Revolving members 657 and 658 are driven by fluid motors 665 or 656 and produce a fluid flow inside the respective duct 606 or 607 which flows out as fluid streams 659 and 660. Fluid flow producing means 652 are provided and driven by power plant 651. Fluid flow producing means 652 produces two fluid streams of proportionate or equal rate of flow. One fluid stream is passed through delivery fluid line 653 from fluid flow producing means 652 into fluid motors 665 and the other of the fluid streams is passed from fluid flow producing means 652 through fluid line 654 into fluid motor 656. Thereby the rotary parts of the fluid motors 665 and 656 are driven and so are the rotary members or propellers 657 and 658 which are connected thereto. The flows of fluid are passed back through the respective fluid motors, and respective return fluid lines 679 directly or indirectly into the fluid flow producing means 652. By the proportionality or the equality of the reaction forces of fluid streams 659 and 660, which is enforced by the heretofore described hydraulic drive means, straightness and stability of movement of sled 603 are assured. An increase of the physical distance between fluid streams 659 and 660 increases the stability of the movement of the sled. It is also possible to provide means for running the sled in curves. A very simple means to obtain this is to provide an inter-fluid line 671 from delivery fluid line 653 to and through bypass means 663. Inter-fluid line 672 may be connected from line 654 to return line 679. By operating the bypass means 664, 663, it is possible to let a fraction of fluid from fluid line 653 escape through the bypass means 663 into the return fluid line. The forces of fluid in stream 659 would thereby be decreased and the sled would run along a curve due to the difference between the driving forces in fluid streams 659 and 660. In the embodiment of FIG. 4, the bypass means 663 can be operated by means of handle 664 to establish either a flow of fluid from fluid line 653 to medial fluid line 671 back into the tank or return fluid line, or to let a portion of the flow of fluid escape out of delivery fluid line 654 through inter-fluid line 672 and bypass means 663 back to the tank or to the return fluid line 679. Such a combined bypass means controlled by a single handle 664 could also be used in others of the vehicles disclosed in the embodiments of this invention. Instead of providing a bypass means, it would also be possible to provide an additional fluid flow producing means, or means for producing an additional control fluid flow.

This control fluid flow would then be branched off from a respective fluid flow producing means, for example 652, through a respective control means 665 and then either through fluid line 661 or through fluid line 662. Thereby, an additional quantity of fluid would be added either to fluid flow 653 or to fluid line 654. Consequently, the respective rotary member 657 or 658 would then revolve respectively faster and the fluid stream 659 or 660 would create a bigger action force for driving the vehicle into a right curve or into a left curve. From the description of FIG. 4, it is clear that different kinds of control means 663 and 664 can be provided in order to obtain a one-handle control for the straight or curved movement of any kind of vehicle of this invention.

The vehicles of FIGS. 3, 4, 10, 12, 13 are intended to be able to run not only on fast ground, but also on unfast or slippery ground, such as sand, mud, ice, snow or the like. On such unfast ground, the control of the direction of movement of the vehicle is sometimes extremely difficult or even dangerous. If the ground-engaging means rolls or slides on unfast or slippery ground, then the ground-engaging means evidently do not provide any traction and the vehicle might run in a curve, tilt at high speed and crash. Many persons have been injured by such accidents in the past in vehicles which only had ground-engaging means for directional and speed control. A typical example of such vehicles with only ground-engaging means for speed and directional control are the snowmobiles. The injuring of persons at snowmobile races is mainly due to the fact that these vehicles, running on slippery or unfast ground, have had to rely on the ground-engaging means for their movement control. The tractionlessness of the ground-engaging means caused the loss of control over the direction of movement of the vehicle, and thus the crash and the injury.

The invention overcomes these dangerous problems entirely by the fact that the vehicle's speed and movement are controlled not by the ground-engaging means, e.g., wheels, runners, etc., but by the equality of thrust of the fluid streams which drive the vehicle and which control its direction and speed. Further, for running curves, special directional control means are supplied and are of such nature that even in curves, a crash of the vehicle is entirely prevented by the control means of this invention. The said control means restrict the rate of fluid flow through the control means drastically, so that the rate of flow in the main fluidstreams is modified only so slightly that a curve travelled by the vehicle can never become tight enough to lead to a crash. The control flows are therefore so restricted by their flow rate that the rate of flow remains at all times only a minor fraction of the rate of flow through the fluid stream creating means which drive the vehicle and stabilize its straight forward motion and speed.

Figures 9, 11:
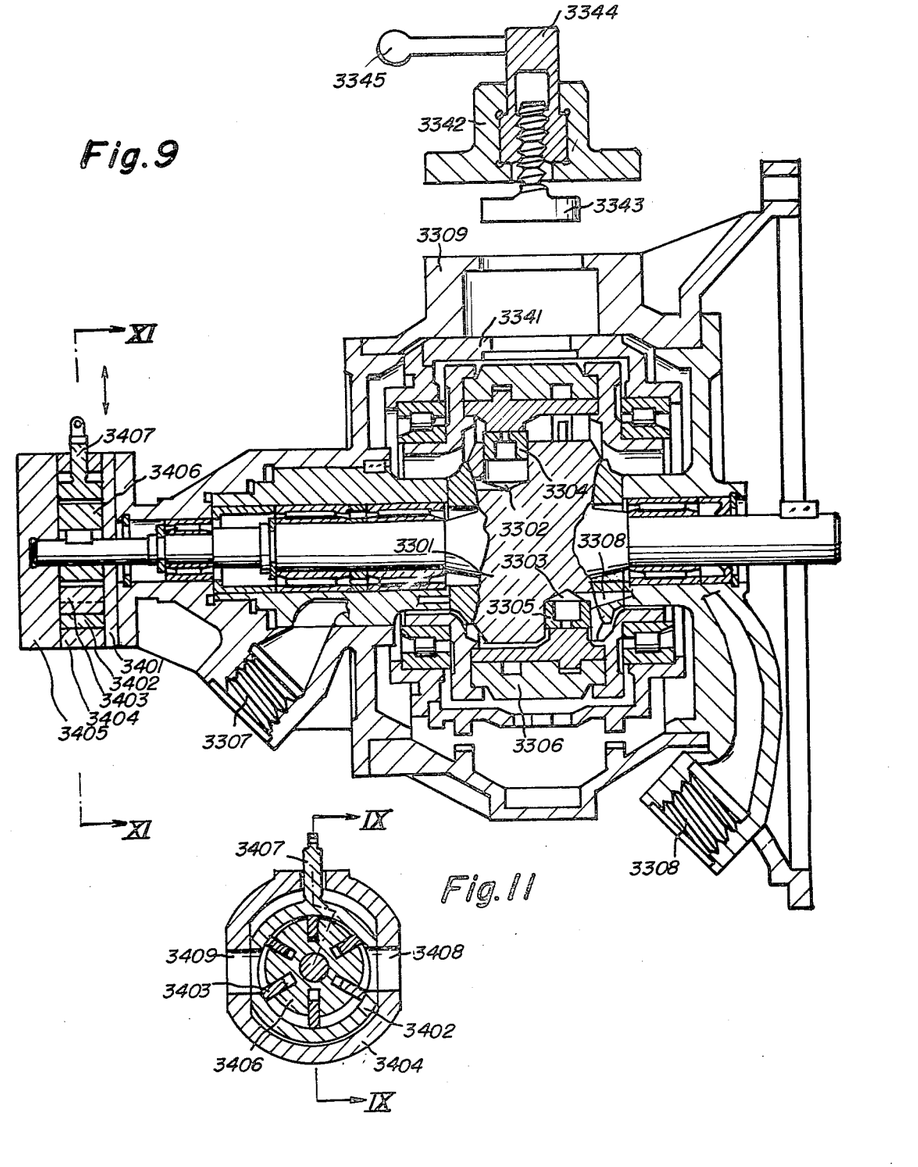
FIG. 9 is an axial section through still a further embodiment.
FIG. 11 is a section taken on line XI—XI of FIG. 9.

At the left end of FIG. 9, there is shown a control flow pump which is also illustrated in a sectional view in FIG. 11. Fluid flows into this control pump through entrance port 3408 and is taken by the vanes 3403 to exit port 3409. The vanes are carried by rotor 3406 and the displacement volume of the fluid handling pump chambers between the vanes, the rotor and the housing walls 3401 and 3405, and the cam ring or actuator 3402 is adjusted by the fluid flow adjustment means 3407. The latter sets the stroke of the vanes by the upward or downward adjustment of the actuator means 3402. The importance attached to this control pump is that the displacement chambers are much smaller in volume then the displacement chambers 3302 and 3303 of the main flow double pump. The main flow out of chambers 3302 of the pump of FIG. 9 drives one of the fluid stream creating means of the vehicle and the main flow out of chambers 3303 drives the other of the fluid stream creating means (propellers) of the vehicle. The flow out of the control pump in FIG. 11, which is restricted to be only a minor rate of flow of the main flows out of chambers 3302 and 3303, is directed by the controller 3407 into one or the other of the main flows out of chambers 3302 or 3303 in order to give one of these main flows a slightly higher rate of flow for directing the vehicle to run a curve.

In order to prevent crashing of the vehicle during running of a curve on unfast ground, it is essential that the displacement volume of the control pump be only a minor fraction of the displacement volume of the main pump, because otherwise the danger would occur that the control pump could change the rate of flow in the main flows so drastically that the courve would become too tight for high speed and the vehicle could crash.

If the vehicle is to be able to turn while standing still, i.e., without forward motion, then the rate of the flows out of the main pump are set to zero by setting the equal actuator means 3306 of the main pump centrically to the axis of the rotor 3301 via the handle 3345. Then the flow out of the main pump is zero and only the flow out of the control pump (FIG. 11 and left end of FIG. 9) enters the respective fluid flow creating means. The vehicle then turns in place, where it stands on the ground. If the vehicle is to run a curve in the other direction from the previous one, or turn in the other direction from the previous one, then the actuator means 3406 of the control pump will move upwards past its central position by controller 3407, so that the flow direction reverses; port 3409 then becomes the entrance and port 3408 becomes the exit port. Therebetween, the rate of flow of the control pump can be varified steplessly in order to obtain any desired rate and any direction of flow out of the control pump. The ports of the control pump are connected to one-way suction valves for suctioning fluid out of a tank and to each one of the main fluid lines, which in turn are connected to the exit ports of the main drive pump.

The equal actuator means 3306 of FIG. 9 is common to both fluid flows which are created in the main pump of the Figure. The actuator means 3306 is adjusted by the controller 3345, 3344, 3342, 3343. The housing 3342 of the controller is fastened to the housing 3309 of the pump and the piston 3343 of the controller is fastened to the adjustment housing 3341, which bears the common actuator means 3306 in respective bearings. If the controller sets the actuator means 3306 into central position, the stroke of the displacement means 3304 and 3305 is zero, so that no fluid flows through the main pump and the vehicle rests. If the actuator means 3306 is moved up or down, then the displacement means 3304 and 3305 are forced to move with equal strokes in the chambers 3302 and 3303 of the rotor 3301 of the pump. Thus, equal rates of flow are forced to leave the pump through spearated exit ports 3307 and 3308. The flow produced in chambers 3302 exits through port 3307, while the flow produced in chambers 3308 exits through port 3308. Since the rotor material separates the chambers 3302 from chambers 3303, and since the actuator 3306 enforces equal strokes of members 3304 and 3305, the rate of fluid flow exiting from port 3307 is and remains at all times substantially equal to that exiting from port 3308, regardless of the pressure in the fluid. Thereby the equality of the rate of flow to the fluid stream creating means (propellers) driving motors is assured, so that the thrust of each of the fluid stream creating means on both sides of the axis of the vehicle remains constant at all times. Of course, the dimensions of the chambers and displacement means of the main pump of FIG. 9 are equal in order to assure the desired equality in the rate of flow in both flows of the main pump. Further, the displacement volume of the chambers of the main pump, meaning chambers 3302 and 3303, must be much larger then the volume of the displacement chambers of the control pump at the end of the main pump, in order to prevent too tight curves of the vehicle.

Figure 8:
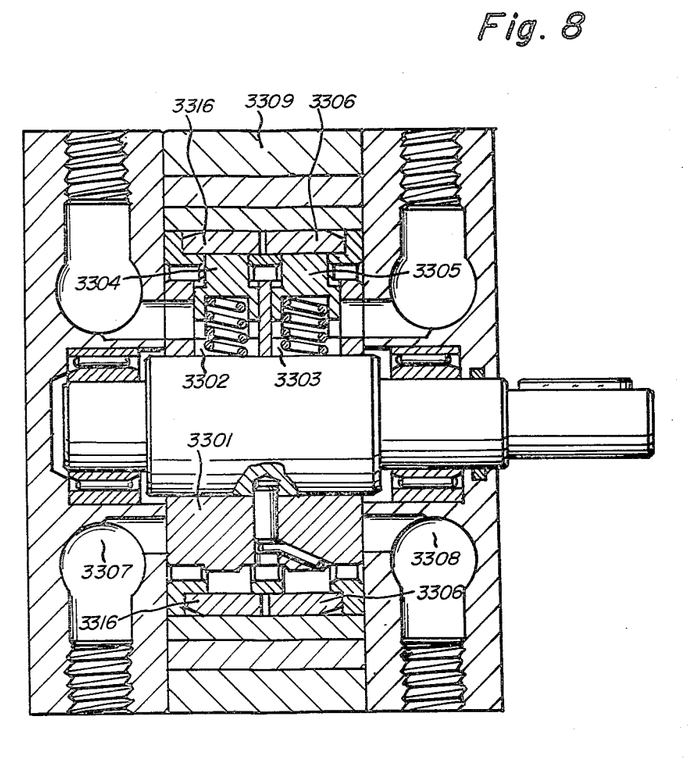
FIG. 8 is an axial section through yet another embodiment of a suitable pump.

The pump of FIG. 8 also supplies two flows of equal rate of flow to force the fluid stream creating means to create equal thrusts on both sides of the axis of the vehicle. The displacement members 3304 and 3305 move in chambers 3302 and 3303 with equal strokes for the intake of fluid into the chamgers and for the exit of equal rates of flow out of the chambers 3302 and 3303. Chambers 3302 and 3303 are separated from each other by the medial wall between them. Fluid enters the chambers through the entrance ports and the flow of fluid out of chambers 3302 leaves the pump through exit port 3307. The flow of fluid out of chamber 3303 leaves the pump through exit port 3308. The stroke of the displacement members, for example, pistons 3304 and 3305 is enforced by the equal actuator means 3306 and 3316 while both have identical dimensions and are equally spaced from the axis of the rotor 3301 contained in housing 3309. The equal size and configuration, and equal distance from said axis of the actuator means 3306 and 3316 defines them as equal actuator means, which enforce equal-length strokes of the equally dimensioned displacement members 3304 and 3305. Thus, equal rates of flow are assured out of the separate exit ports of pump 3309 in FIG. 8 at all times and substantially regardless of the pressure in the separated flows of fluid leaving the pump.

Figures 14, 16:
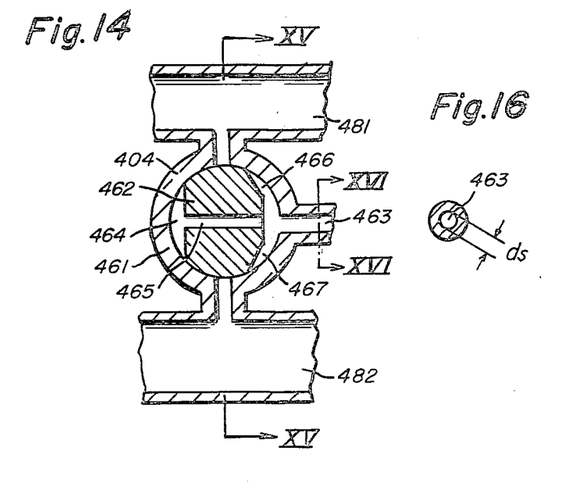
FIG. 14 is a fragmentary sectional view showing details of FIG. 4.
FIG. 16 is a section on line XVI—XVI of FIG. 14.
Figure 15:
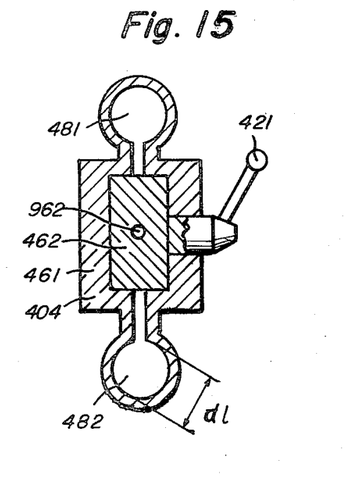
FIG. 15 is a section of line XV—XV of FIG. 14.

FIGS. 14–16 show the controller 663 of FIG. 4 on an enlarged scale to illustrate details. Lines 481 and 482 are the main fluid lines connecting the pump 652 of FIG. 4 with the fluid motors 656 and 665. In accordance with this invention, the fluid line 464 to or from the control valve 404 is restricted so that its cross-sectional area is only a minor fraction of the cross-sectional area of the main fluid flow lines 481 and 482. This is a necessity in order to assure that the flow of fluid through the control valve 404 remains at all times restricted to a rate of flow which is only a minor fraction of the rate of flow through the main fluid lines. This means the restricted flow can never, at high speeds of the vehicle, increase the rate of flow in one of the main flows too drastically, so that the vehicle can never travel in too tight a curve. Thereby the vehicle is prevented from tilting or crashing, even at high speed and in a no-traction condition of the ground-engaging means in a tight curve. The diameter $d_s$ of the control flow fluid line 463 must at all times be only a minor fraction of the diameter $d_1$ of the main flow, in accordance with this invention. Control body 462 can be turned by the control handle 421 to communicate control fluid supply line 463 either with fluid line 481 or 482 in order to force the vehicle to run a right or left curve by increasing the rate of flow of fluid and thereby the thrust of one of the fluid stream creating means at the one or the other side of the axis of the vehicle. In the position shown in FIG. 14, the control valve is set to the neutral position, so that no flow can flow through the valve and the supply line 463 remains separated from the main fluid lines 481 and 482. The numerals 466 and 467 show notches for the stepless variation of the supply rate of control fluid to the fluid line 481 or 482. The passage 465 supplies fluid into the balancing recess 464 for causing the control body 462 to float between the pressurized fluid pockets 464 and 466-467-463. Thereby an easy turning of the control body 462 in the housing 404 is assured.

FIG. 10 is a cross-sectional view of FIG. 3 on the line X—X showing that the fluid stream creating means, for example propellers 637 and 638, are assembled in ducts 608 and 609. This is desirable to insure that no person or animals can be accident contact the propellers of the vehicle; at the same time, the ducts increase the thrust of the propellers considerably, especially during slow motion or start-up of the vehicle, by a value up to 25 or even 40 percent, depending on the configuration and size of the ducts.

Figure 12:
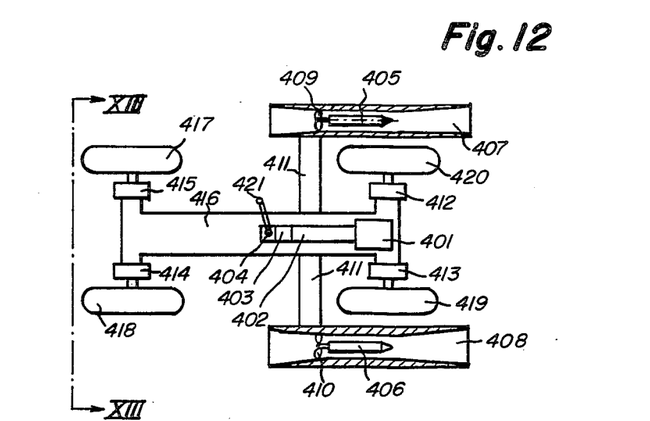
FIG. 12 is a top plan view of another embodiment of the novel vehicle, partly in section.
Figure 13:
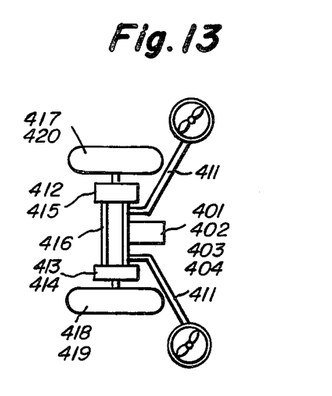
FIG. 13 is an end view of the vehicle in FIG. 12, as seen from line XIII—XIII.

FIG. 12 is a view from above upon an embodiment of another, more universal, vehicle of the invention, and FIG. 13 is a view of the vehicle of FIG. 12 from the line XIII—XIII. In this vehicle the ground-engaging means are rolling means, for example wheels, treads or snowmobile belts, and they are driven by the fluid motors 412 to 415. Each wheel or the like is driven by one or more fluid motors. The fluid stream creating means 409 and 410 are driven by the fluid motors 405 and 406, respectively, and are preferably again, as in FIG. 3, mounted in ducts to prevent accidents and in order to increase the thrust so that smaller-diameter fluid stream creating means can produce the same thrust as bigger-diameter fluid stream creating means would have without the ducts. The fluid stream creating means and the ducts and the respective motors are fastened at opposite sides of the axis of the vehicle by the holders 411 while the wheels or ground-engaging means and their driving motors are fastened to the body 416 of the vehicle. The ground-engaging means are identified by numerals 417 to 420. On fast ground the vehicle may be driven by the ground-engaging means. The power plant 401 drives the pump means 402 and perhaps the control pump 404 with controller 421 if the pump of FIG. 9 is used to drive the vehicle. The pump means 402 has thereby at least two flows of equal rate of flow in accordance with this invention. Numeral 403 can be a by-pass controller as in FIGS. 14 to 16. It is preferred, however, to use as the pump 402 a four-flow pump, for example, that of FIG. 17. Then on fast ground and high speed operation a controller 403 can combine the flows of the pump of FIG. 17 to produce two pairs of flows each to drive one motor and the ground-engaging means 417–420. If the ground is only slightly soft, slippery or uneven, the vehicle can run at half speed by directing via the controller 403 one flow of the four-flow pump of FIG. 17 into each motor 412 to 415 for driving each ground-engaging means 417 to 420 separately and with an equal rate of flow. (Four wheel drive.) If the ground becomes fully soft or slippery, and the vehicle can no longer be driven by the ground-engaging means, then each pair of two flows of pump of FIG. 17 will be directed to one of the fluid motors 405 or 406 for driving the fluid stream creating means 409 and 410.

Figure 17:
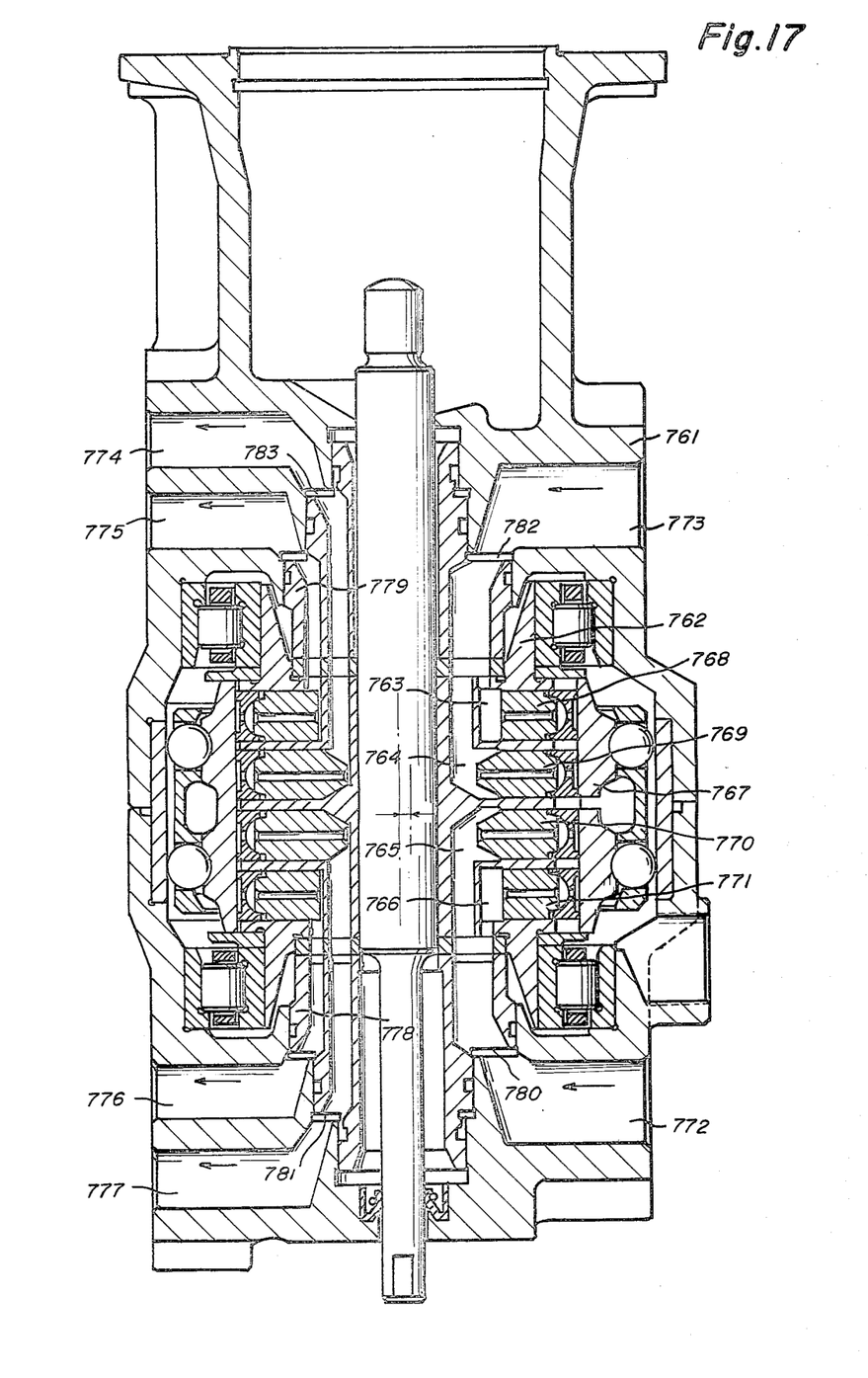
FIG. 17 is a longitudinal section through a four-flow pump for use in my novel vehicle.

FIG. 17 is a longitudinal section through a four-flow pump which produces four flows of equal rate of flow and supplies them separately out of the pump through exit ports 774 to 777. This pump is preferably used to drive the vehicle of FIGS. 12–13, but it can be also used to drive the other vehicles discussed herein. The four-flow version can be modified to the double flow version by combining any two of the exit ports 774 to 777. Fluid enters the pump of FIG. 17 through the entrance ports 772 and 773 via thrust control members 778 and 779 and is admitted into the four separate working chambers 763 to 766. In the working chambers 763 to 766, the displacement members (pistons) 768 to 771 move alternately outward and inward to intake and expel fluid. The chambers 763 to 766 are separated from each other by the body of the rotor. The equal or common actuator 767 has an axis which is eccentrically spaced from the axis of the rotor. Thereby the stroke of the displacement members 768 and 771 is forced to be and remain at all times equal, whereby the desired equality in the rate of flow of fluid out of the pump from all exit ports is enforced and assured. The displacement members may slide with slide members along the inner face of the actuator 767. In order to assure the desired equality in the rate of flow for all four separate flows of fluid, the actuator 767 must be a common one for all four flows, or if a number of actuators 767 are used, then they must be equal actuators of equal size and equal eccentric location in order to assure the equality of stroke of the displacement members and thereby the equality of rate of flow in the separate fluid streams, and the equality of thrust in the fluid stream creating means which drive the respective vehicle. Thrust control members 778 and 779 are forced into sealing engagement with the rotor through fluid pressure in pressure chambers 780 and 783. The design of the four-flow pump is by way of example and shows a most effective high speed four-flow pump of equal rates of flow. But the vehicle could also be driven by four separate pumps or by two separate pumps, if the desired equality in the rate of flow of all pumps would be assured. That could be done by equal actuator means for equal speeds of pumps in accordance with this invention.

While it has heretofore been described, that the vehicle is driven, it will be appreciated, that the vehicle can also be effectively braked. That is done by reversing the rotary velocity direction of the fluid motors.

The reversing of the rotary direction can be done by setting flow directional control valves to respective fluid lines. Such directional control valves for hydraulic flows are known in the art and commercially available.

A most simple and effective means for reversing the direction of the respective fluid operated motors and fluid-stream creating means however is demonstrated in FIG. 9. This is a variable double flow pump of equal rate of flow in both flows. By moving the actuator means 3306 over the medial zero position into the other direction, the direction of flow becomes reversed. The rotary direction of the fluid motors associated to the respective fluid lines thereby also reverses and the rotary direction of the fluid stream creating means reverses also. The reversible-action can be done steplessly variable. For braking the vehicle's speed or for driving the vehicle backwards the full power of the power plant can be utilized by means of reversing the flowdirection of the pump of FIG. 9. A strong and effective braking action can thereby be achieved and no conventional brakes are needed on the vehicle at operation of the vehicle.

It will be understood that each of the elements described above, or two or more together, may also find a useful application in other types of applications differing from the type described above.

While the invention has been illustrated and described as embodied in a fluid stream-driven vehicle, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A vehicle comprising:
a body;
at least one fluid-stream creating means on each lateral side of said body;
a fluid operated motor for driving each said fluid-stream creating means;
at least one rear wheel on each lateral side of said body;
at least one front wheel on each lateral side of said body;
a fluid operated motor for driving each said wheel;
means for producing at least four, separate, equal fluid flows; and
fluid-flow conrol means for selectively directing said four fluid flows to said wheel motors, respectively for low speed, four wheel drive, or combining said four fluid flows into two equal flows and either directing said two equal flows to two of said wheel motors on opposite lateral sides of said vehicle for high speed, two wheel drive or directing said two equal flows to said motors of said fluid stream creating means for fluid-stream created drive of said fluid-stream creating means.

2. A vehicle, comprising:

a body, at least one fluid-stream creating means on each lateral side of said body;

a fluid operated motor for driving each said fluid-stream creating means;

and means for providing fluid pressure for driving each said motor, said providing means including:

a first working chamber group having a first plurality of fluid containing chambers and means for displacing the volume of each chamber of said first plurality whereby said first plurality of chambers collectively produce a first fluid flow, a second working chamber group having a second plurality of fluid containing chambers and means for displacing the volume of each chamber of said second plurality whereby said second plurality of chambers collectively produce a second fluid flow, means for equally actuating all of said displacing means whereby said first and second fluid flows are always equal, a first fluid inlet line connected between said first group and one said motor for delivering said first fluid flow thereto, a second fluid inlet line connected between said second group and the other said motor for delivering said second fluid flow thereto, whereby one said fluid stream creating means produces a thrust equal to the thrust of the other said fluid-stream creating means for driving said vehicle in a straight path, and a control pump for selectively adding fluid to one of said fluid flows causing said one fluid-stream creating means to produce a greater thrust than said other fluid-stream creating means for turning said vehicle from said straight path.

* * * * *